United States Patent [19]
Doshi et al.

[11] Patent Number: 5,669,959
[45] Date of Patent: Sep. 23, 1997

[54] PROCESS FOR SAFE MEMBRANE OPERATION

[75] Inventors: Kishore J. Doshi, Lake Zurick; William B. Dolan, Mt. Prospect, both of Ill.

[73] Assignee: UOP, Des Plaines, Ill.

[21] Appl. No.: 648,785

[22] Filed: May 16, 1996

[51] Int. Cl.⁶ .................. B01D 53/22; B01D 53/04
[52] U.S. Cl. ............... 95/51; 95/90; 95/96; 95/115; 95/143
[58] Field of Search .................. 95/43–56, 90, 95/96, 114, 115, 124, 125, 143, 148

[56] References Cited

U.S. PATENT DOCUMENTS

| | | | |
|---|---|---|---|
| 4,466,946 | 8/1984 | Goddin, Jr. et al. | 95/51 X |
| 4,484,933 | 11/1984 | Cohen | 95/125 X |
| 4,639,257 | 1/1987 | Duckett et al. | 95/51 X |
| 4,645,516 | 2/1987 | Doshi | 95/51 |
| 4,701,187 | 10/1987 | Choe et al. | 95/53 |
| 4,717,407 | 1/1988 | Choe et al. | 95/53 X |
| 4,781,907 | 11/1988 | McNeill | 95/51 X |
| 4,822,382 | 4/1989 | Nelson | 95/54 |
| 4,881,953 | 11/1989 | Prasad et al. | 55/16 |
| 4,944,776 | 7/1990 | Keyser et al. | 95/52 X |
| 5,004,482 | 4/1991 | Haas et al. | 95/52 |
| 5,030,251 | 7/1991 | Rice et al. | 55/16 |
| 5,118,327 | 6/1992 | Nelson et al. | 95/52 X |
| 5,131,929 | 7/1992 | Brockmann et al. | 95/52 |
| 5,169,412 | 12/1992 | Prasad et al. | 95/47 |
| 5,181,942 | 1/1993 | Jain | 95/45 |
| 5,226,932 | 7/1993 | Prasad | 95/45 |
| 5,240,472 | 8/1993 | Sircar | 95/52 |
| 5,332,424 | 7/1994 | Rao et al. | 95/47 |
| 5,354,547 | 10/1994 | Rao et al. | 95/45 X |
| 5,383,956 | 1/1995 | Prasad et al. | 95/45 |
| 5,411,721 | 5/1995 | Doshi et al. | 95/51 X |
| 5,435,836 | 7/1995 | Anand et al. | 95/45 |

*Primary Examiner*—Robert Spitzer
*Attorney, Agent, or Firm*—Thomas K. McBride; John G. Tolomei; Richard P. Silverman

[57] ABSTRACT

A process is disclosed for the shut-down of a membrane separation zone comprising a non-permeate side and a permeate side and processing a feed stream comprising a non-permeable component, a less-readily permeable, condensible component, and a readily permeable component. When the feed stream is not passed to the membrane separation zone, a purge stream is passed to the non-permeate side of the membrane separation zone to remove a residual gas stream and thereby prevent condensation of the less-readily permeable, condensible component upon depressurization and/or cooling of the membrane separation zone. The invention reduces the need for oversizing membrane system which reduces treating costs and prevents permeate damage to membrane surfaces caused by condensation of less-readily permeable, condensible components such as $C_6^+$ hydrocarbons.

25 Claims, 1 Drawing Sheet

PROCESS FOR SAFE MEMBRANE OPERATION

FIELD OF THE INVENTION

This invention relates to a process for safe membrane operation and more particularly relates to a procedure for operating a continuous membrane separation process wherein membrane degradation may be prevented during membrane shut-down, particularly during sudden or unexpected shut-down of the membrane separation zone, and most specifically the invention relates to a method for safe membrane shut-down within a process for the removal of carbon dioxide from light hydrocarbon gases.

BACKGROUND OF THE INVENTION

Permeable membrane processes and systems are known in the art and have been employed or considered for a wide variety of gas and liquid separations. In such operations, a feed stream is brought into contact with the surface of a membrane, and the more readily permeable component of the feed stream is recovered as a permeate stream, with the less-readily permeable component being withdrawn from the membrane system as a non-permeate stream. Membrane separation modules are maintained at operating conditions which result in a non-permeate side pressure at which the feed gas is introduced and the non-permeate stream is withdrawn, and a permeate side pressure at which the permeate stream is withdrawn. The pressure on the non-permeate side of the membrane is higher than the pressure on the permeate side, and the pressure differential between the non-permeate and the permeate sides of the membrane generally determines the degree of separation attained by the membrane separation.

Membranes are widely used to separate permeable components from gaseous feed streams. Examples of such process applications may include removal of acid gases from natural gas streams, removal of water vapor from air and light hydrocarbon streams, and removal of hydrogen from heavier hydrocarbon streams. Membranes are also employed in gas processing applications to remove permeable components from a process gas stream. Natural gas as produced from a gas well presents a separations challenge. Often the natural gas is found together with other components such as sulfur compounds, water, and associated gases. The associated gases found in natural gas streams typically include carbon dioxide, hydrogen sulfide, nitrogen, helium, argon, and the like. Generally, these other gas components are separated from the natural gas by bulk methods employing membrane systems.

The inherent simplicity of such fluid separation operations constitutes an incentive in the art to expand the use of membrane systems in practical commercial operations. In this regard, it will be appreciated that the selectivity and permeability characteristics of such membrane systems must be compatible with the overall production requirements of a given application. It is also necessary, of course, that the membranes exhibit acceptable stability and do not suffer undue degradation of their performance properties in the course of practical commercial operations.

Membranes for gas processing typically operate in a continuous manner, wherein a feed gas stream is introduced to the membrane gas separation module on a non-permeate side of a membrane. The feed gas is introduced at separation conditions which include a separation pressure and temperature which retains the components of the feed gas stream in the vapor phase, well above the dew point of the gas stream, or the temperature and pressure condition at which condensation of one of the components might occur. However, if the flow of the feed gas stream is interrupted, or the feed pressure is suddenly reduced, the residual material within the membrane separation zone could reach its dew point and condensation would result. The feed gas stream fed to the gas separation membrane, however, may contain a substantial amount of moisture and may cause corrosion and condensation in instrumentation, piping, pneumatic tools, ventilators and other equipment associated with the gas separation membrane. In certain instances, it may also lead to inferior performance of the gas separation membrane and/or other equipment such as adsorption traps. In anticipation of a reasonable amount of condensation, membrane systems are often oversized to compensate for the loss of membrane surface over the useful life of the membrane. However, for high volume gas treating application, this over design of membrane capacity can be very costly.

For gas drying applications, methods has been disclosed for the employing sweep gases to remove moisture from the membrane before it condenses. For example, in air separation applications which constitute a highly desirable field of use for permeable membranes, oxygen is typically the more readily permeable component of the feed air for particular membranes and is withdrawn as the permeate gas. In such embodiments, nitrogen is the less-readily permeable component and is recovered as non-permeate gas. Liquid water is generally removed from feed air upstream of the membrane by conventional means such as knockout drums. Generally, any water vapor present in the feed air will permeate the membrane resulting in a dry non-permeate gas. In air separation applications, it has been found that the performance characteristics of the membranes are sensitive to the presence of certain contaminants in the feed air stream. Exposure to such contaminants may result in a significant reduction in the permeability of the membrane in use. Fortunately, most contaminants commonly present in ambient air, such as light hydrocarbons, $H_2O$, and $CO_2$, have been found to result in, at most, a modest decrease in membrane permeability. The presence of even relatively low concentrations, e.g., less than 1 ppm by volume as $C_{10}$, of heavy hydrocarbon oil vapors, such as might enter the feed air stream from an oil lubricated air compressor, can result in rapid and extensive loss of membrane permeability.

In response to such an undesirable decrease in membrane permeability, it is presently common membrane practice to size the active membrane surface area with a safety factor sufficiently large to compensate for the anticipated permeability loss from all sources. Initially, therefore, the membrane system is significantly oversized for the desired product flow, and the feed gas compressor is typically operated in a turndown mode. As permeability degradation proceeds, either the operating temperature or pressure, or both, are increased to compensate for the decrease in permeability. In some instances, it is necessary or desirable to by-pass some of the modules in the membrane system initially so as to reduce excess membrane area employed when the membranes exhibit their full permeability capability and subsequently to bring such by-passed modules on stream as degradation of the initially employed modules progresses. In such instances, it will be appreciated that, in addition to a significant capital cost penalty associated with the provision of extra membrane surface area, such a membrane system must operate over a significant portion of its operating life under off design conditions and that the control strategy for such a membrane system is more complex than for a system operating closer to its optimum design conditions.

As an alternative to such over design of membrane systems to compensate for degradation in use, attempts have been made to restore lost performance, but such efforts were initially unsuccessful in developing an economically feasible means for restoring the permeability of degraded membranes. Restoring any portion of the degraded membranes would require interruption of the gas treating operation, displacing large quantities of gas. Neither over design of the membrane system nor interruption of gas product operations for membrane restoration treatment, or a combination of these approaches is an entirely satisfactory means for overcoming permeability degradation in practical commercial air or other gas separation operations. Further improvement in the response to the problem of membrane degradation is highly desirable in the membrane art.

U.S. Pat. No. 4,881,953 to Prasad et al. discloses an approach to the problem of preventing premature loss of membrane capacity by passing the feed gas mixture through a bed of adsorbent material, such as activated carbon to adsorb contaminants such as heavier hydrocarbon contaminants without the removal of lighter hydrocarbons. Prasad requires that a means for removing moisture from the feed gas be provided because high moisture levels generally limit the ability of activated carbon adsorbents to retain their adsorptive capacity for heavy hydrocarbons.

U.S. Pat. No. 5,030,251 relates to the operation of a membrane separator which removes water vapor from a moist air feed to produce a drier air product. When such a membrane operation is stopped, some residual water vapor remains in the membrane separator and when the feed flow is resumed, the residual water vapor flows out with the non-permeate stream. This results in a less dry product produced during restarts than during the steady-state operation of the membrane separator. To correct this problem, a portion of the non-permeate product is saved in a storage tank and supplied to the membrane separation at a time when the feed is not being supplied to the separator to purge the residual water vapor between cycles. As disclosed, when the feed cycle is off, the air pressure of the non-permeate side of the separator reduces to atmospheric pressure. Then, because the pressure in the storage tank is greater than atmospheric, some of the stored non-permeate bleeds back to form the purge stream.

U.S. Pat. No. 5,383,956 to Prasad et al., relates to processes and apparati for starting up and shutting down membrane gas separation systems treating a wet gas feed gas stream. The process of Prasad et al. employs a membrane dryer module and a gas separation membrane module in various start up sequences and shut-down sequences for drying and separating the feed gas stream. In the shut-down of Prasad et al. which comprises at least one gas separation module and at least one membrane dryer, the flow of the feed gas is stopped to both membrane modules, and the modules are depressurized by removing pressurized gas from the non-permeate sides of the modules. The pressurized gas is allowed to permeate through the respective membrane modules to the permeate sides, followed by purging both the permeate and non-permeate sides of the membrane modules with a dry gas stream.

When a natural gas stream is processed in a membrane separation zone, the presence of heavy hydrocarbons, such as $C_6$ plus hydrocarbons, and particularly $C_{10}$ plus hydrocarbons under certain conditions such as reduction of temperature and pressure, or a change in composition can result in the loss of membrane capacity and often permanent damage to the membrane. Processes are sought to prevent such damage to the membrane separation unit.

It is an object of the invention, therefore, to provide an improved membrane system and process for overcoming the problem of degradation of permeability during hydrocarbon gas production operations such as in natural gas production.

It is another object of the invention to provide a membrane system and process obviating the need for significant over design or for premature replacement of degraded membrane modules.

It is a further object of the invention to provide a membrane system and process for maintaining membrane permeability and minimizing the need for the interruption of gas producing operations for the treatment of membrane modules for restoration of the permeability characteristics thereof.

SUMMARY OF THE INVENTION

The invention provides a process for the safe shut-down of a membrane separation system which minimizes the risk of damage to the membrane. It was discovered that membrane processing streams, comprising less-readily permeable, condensible components such as $C_6^+$ hydrocarbons in an environment in which condensing of such hydrocarbons may occur, can be subject to catastrophic failure when such hydrocarbon condensation is followed by conventional shut-down procedures such as depressurization of the non-permeate side. Depressurization of the membrane upon shut-down was found to be desirable when it occurred simultaneously with purging of the non-permeate zone of the membrane unit. By the present invention, it was found that condensation followed by drying without change in the relative pressures of the permeate and non-permeate sides of the membrane avoided degradation and surprisingly maintained or even improved selectivity.

In a broad aspect of the present invention is a process for the safe shutdown of a membrane separation zone for the removal of a readily permeable component from a feed gas mixture comprising the readily permeable component, a non-permeable component, and a less-readily permeable, condensible component. The process comprises intermittently passing the feed gas mixture at separation conditions to a membrane separation zone to provide a non-permeate stream and a permeate stream. The membrane separation zone has a non-permeate side and a permeate side. The non-permeate stream is withdrawn from the non-permeate side of the membrane separation zone and a permeate stream at a permeate pressure is withdrawn from the permeate side of the membrane separation zone. When the feed gas mixture is not passed to the membrane separation zone, a purge stream reduced in the less-readily permeable, condensible component is passed at a pressure greater than the permeate pressure to the non-permeate side of the membrane separation zone to remove at least a portion of a residual gas remaining in the non-permeate side of the membrane separation zone before the residual gas condenses in the membrane separation zone.

In a specific embodiment of the invention, the invention relates to a process used intermittently for the removal of carbon dioxide from a hydrocarbon gas feed stream to produce a sales gas stream. The hydrocarbon gas feed mixture comprises $C_1$ to $C_6$ hydrocarbons, carbon dioxide and $C_6^+$ hydrocarbons. The $C_6^+$ hydrocarbons are less-readily permeable and condensible. The hydrocarbon gas feed mixture is passed to a membrane separation zone having a non-permeate zone and a permeate zone at separation conditions to provide a non-permeate stream withdrawn from the non-permeate zone and a permeate stream at a permeate pressure withdrawn from the permeate zone. The non-permeate stream comprises $C_6^+$ hydrocarbons and a reduced amount of carbon dioxide relative to the hydrocarbon gas feed mixture. The permeate stream is enriched in carbon dioxide relative to the hydrocarbon gas feed mixture. Intermittently, when the hydrocarbon feed mixture is not passed to the membrane separation zone, a purge stream reduced in $C_6^+$ hydrocarbons relative to the $C_6^+$ hydrocarbons in the non-permeate stream is intermittently passed at a pressure greater than the permeate pressure to the non-permeate zone to prevent condensation of $C_6^+$ hydrocarbons in the non-permeate stream remaining in the non-permeate zone.

DETAILED DESCRIPTION OF THE INVENTION

Figure 1:
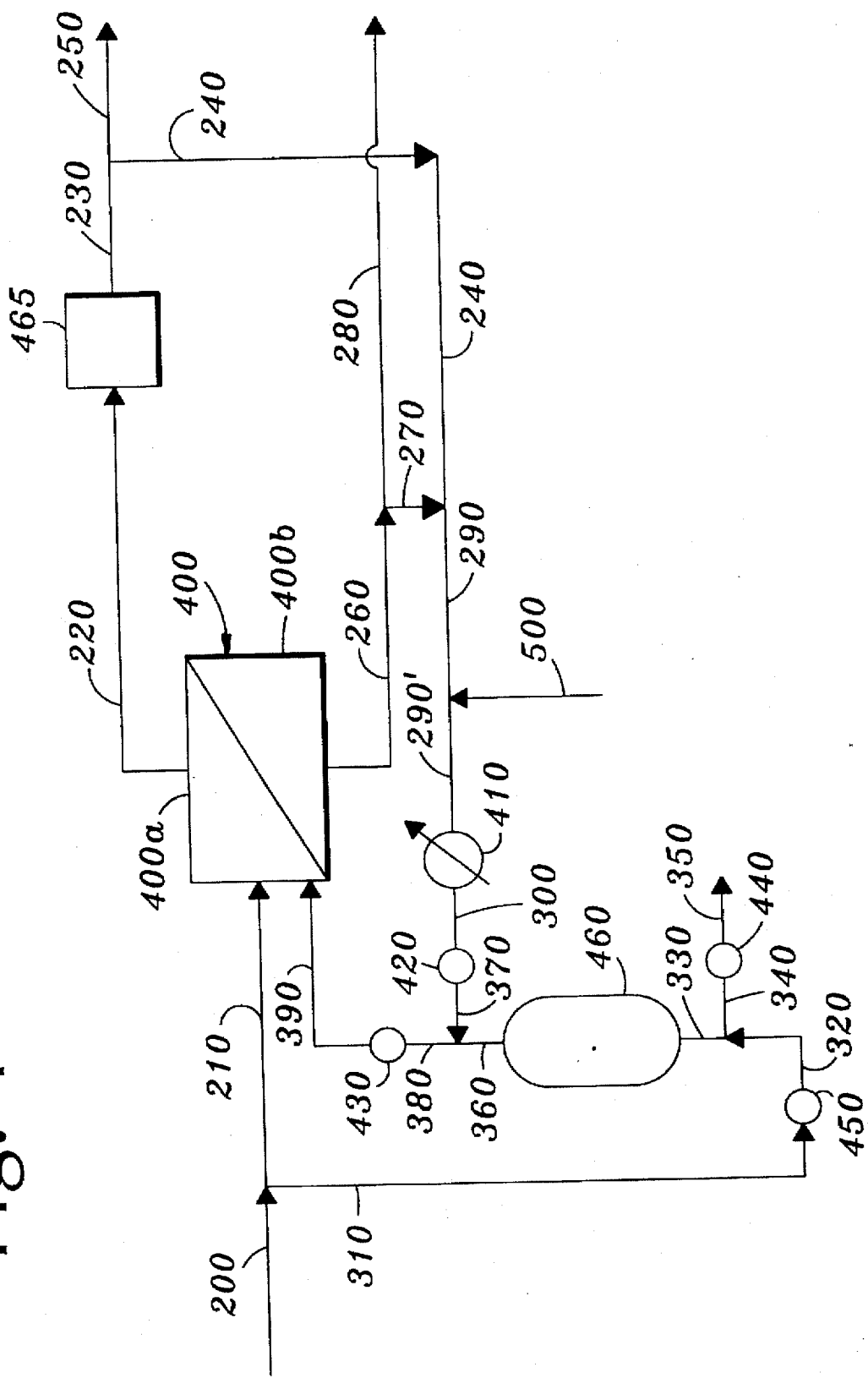
FIG. 1 is a schematic flow diagram of the process of the present invention.

The invention is useful for the rejection of carbon dioxide from a hydrocarbon or natural gas stream in a membrane separation zone to provide a purified natural gas stream which can be subsequently processed in a natural gas process plant for the further removal of heavy hydrocarbons such as $C_6^+$ hydrocarbon to provide a sales gas stream or purified natural gas stream. The gas feed stream may be passed to a membrane separation unit to provide a permeate gas stream comprising carbon dioxide and a non-permeate gas comprising light hydrocarbons. Preferably, the natural gas feed stream comprises heavy hydrocarbons in an mount greater than about 500 ppm and more preferably the gas feed stream comprises about 500 ppm to about 2 mol-% heavy hydrocarbons.

The term "enriched" as utilized herein is meant to refer to the concentration of a component of a product stream in relation to the concentration of that component in the feed stream. For example, the permeate stream from the membrane separation zone will be enriched in the readily permeable component relative to the concentration of the readily permeable component in the feed. The term "membrane separation zone" means one or more device having at least one membrane useful for permeating or separating readily permeable components from a feed gas mixture. As used herein, the term "dew point" means temperature at a given pressure wherein vapor such as hydrocarbon or water begins to condense.

Permeable membranes capable of separating at least one selected component from a fluid mixture, either gas or liquids, are considered in the art as convenient, potentially highly advantageous means for achieving desirable fluid separation and/or concentration. Membranes suitable for the present invention include composite membranes such as those membranes disclosed in U.S. Pat. No. 4,822,382, which is hereby incorporated by reference.

As used in the present application, the term "intermittently" refers to a continuous process which has periods of intermission, particularly unplanned or sudden intermissions or interruptions in the normal feed flow. During the period of interruption the membrane must be safely shut-down or damage to the membrane may occur. Applicant provides a process for the safe shut-down of a membrane that is particularly useful for such unplanned, or intermittent shut-downs wherein the conditions identified by the Applicant which result in damage to the membrane are mitigated.

Upon shut-down, condensation in a membrane may result from a phenomena known as "retrograde condensation."

Retrograde condensation refers to condensation which occurs in a manner which is opposite to expected behavior. For example, in a membrane when a mixture of gases is present, condensation may occur when the pressure is reduced. According to the present invention, a feedstream comprising a mixture of a permeable, non-condensible component and a less-readily permeable, condensible component is passed to a membrane unit. The membrane comprises a non-permeate zone from which a non-permeate stream is withdrawn and a permeate zone from which a permeate stream is withdrawn. When the membrane is subject to a sudden interruption and the termination of the flow of the feedstream to the membrane, there is a potential for condensation on the membrane. The following explanation is believed to describe the events resulting in condensation on the membrane. Although the flow of the feedstream has stopped, the permeation of the permeable, non-condensible component continues. This continuation of the permeation process often results in a decrease in pressure in the non-permeate zone of the membrane. Combined with a Joule-Thompson cooling effect, both temperature and pressure on the non-permeate side are reduced. As the pressure in the non-permeate zone decreases, the partial pressure of the less-readily permeable, condensible component increases. Unless some change is introduced to the non-permeate zone, the partial pressure of the less-readily permeable, condensible component may reach a point at which liquid will form and condensation will take place. The present invention acts to mitigate this retrograde condensation by purging the non-permeate zone of the membrane unit with a purge stream which maintains the partial pressure of the less-readily condensible component in the non-permeate zone above the dew point, or the point at which condensation will occur. For example, in a process for the treating of a natural gas stream, the invention comprises passing—at an operating pressure—a mixture of permeable, non-condensible light hydrocarbons such as $C_1$ to $C_6$ hydrocarbons and carbon dioxide and less-readily permeable, condensible components such as $C_6^+$ or $C_{10}^+$ hydrocarbons to a membrane unit having a non-permeate zone and a permeate zone. A non-permeate stream reduced in carbon dioxide is withdrawn from the non-permeate zone at a pressure essentially equal to the operating pressure, and a permeate stream enriched in carbon dioxide relative to the feedstream is withdrawn from the permeate zone at a low pressure. Suddenly terminating the feedstream flow to the membrane and the blocking of the non-permeate and permeate flows results in the decrease in pressure of the non-permeate zone as carbon dioxide continues to permeate through the membrane. The removal of carbon dioxide from the non-permeate zone by permeation increases the partial pressure of the $C_6^+$ or $C_{10}^+$ less-readily permeable, condensible component and, if not prevented, may result in condensation and damage to the membrane. According to the present invention, upon interruption of the feedstream flow, the non-permeate zone is purged with a purge stream such that the partial pressure of the less-readily permeable, condensible component is maintained above the point of condensation. This requires that the purge gas stream comprise less of the less-readily permeable, condensible component than the amount of less-readily permeable, condensible component in the non-permeate zone. Preferably, the purge gas stream reduced in the less-readily permeable, condensible component comprises less than 90 mol-% of the less-readily permeable, condensible component in the non-permeate stream, and more preferably, the purge gas stream comprises less than 10 mol-% of the less-readily permeable, condensible component in the non-permeate stream, and most preferably, the purge gas stream comprises less than about 0.1 mol-% of the less-readily permeable, condensible component in the non-permeate stream.

Membrane operation is measured by the selectivity of the membrane and the permeability of a component through the membrane. These parameters depend upon the partial pressure driving forces between the non-permeate and permeate zones for each component. In the separation of two components in a membrane unit when the molar flow ratio of permeate flow to feed flow is low, the selectivity is the product of the ratio of the mole fractions of the components in the feedstream and the inverse ratio of the partial pressure driving force between the non-permeate and permeate zones, wherein the partial pressure driving force for a given component of a mixture is the difference between the partial pressure of the component in the feed less the partial pressure of the component in the permeate. As stated in equation form:

$$x_1*(pp_{f2}-pp_{p2})/x_2*(pp_{f1}-pp_{p1})$$

wherein $x_1$ and $x_2$ are the feed mole fractions of components 1 and 2; $pp_{f1}$ and $PP_{f2}$ are the partial pressures of the components 1 and 2 in the feedstream; and $pp_{p1}$ and $pp_{p2}$ are the partial pressure of the components 1 and 2 in the permeate stream. Permeability for a low molar flow ratio of permeate flow to feed flow, expressed in terms of each component, is the flow of the component through the membrane divided by the product of the surface area of the membrane and the partial pressure driving force for that component between the feedstream and the permeate partial pressures. In equation form, the permeability of component 1 is expressed as follows:

$$F_p*x_{f1}/A*(P_h*x_{f1}-P_l*x_{p1})$$

wherein $F_p$ is the permeate flow rate from the membrane zone; A is the surface area of the membrane; $P_h$ and $P_l$ are the total pressures of the feedstream and the permeate stream; and $x_{p1}$ and $x_{f1}$ are the mole fractions of component 1 at the permeate end and feedstream end of the membrane.

In one embodiment, the purge gas comprises the sales gas from the gas processing plant downstream of the membrane separation zone. In another embodiment, the purge gas comprises another effluent stream derived from the adsorption of the heavier hydrocarbons from a portion of the feed gas stream. According to the invention, a portion of the feed stream is passed to an adsorption bed containing a selective adsorbent for the adsorption of heavy hydrocarbons to produce the adsorber effluent essentially free of hydrocarbons. When the feed to the membrane is resumed, the adsorption bed may be regenerated in the conventional manner with a heated regeneration gas stream. Although any suitable gas stream may be employed for such purpose, it is preferred that the regeneration gas stream be selected from the group consisting of nitrogen, a fuel gas stream, portions of the sales gas, permeate gas, and non-permeate gas streams, and mixtures thereof. Permeate gas is more preferred because it is essentially free of heavy hydrocarbons such as $C_6^+$ or $C_{10}^+$ hydrocarbons. The spent regenerant gas can be employed for fuel use.

The adsorption zone of the present invention relates to conventional thermal swing processing in which each bed of an adsorption zone undergoes, on a cyclic basis, adsorption at an adsorption temperature wherein the more readily adsorbable component(s) in the feed stream are selectively adsorbed to provide an adsorption effluent stream enriched in the less-readily adsorbable components, regeneration at a desorption temperature that is higher than the adsorption temperature which is conducted by passing a purge gas at an elevated temperature, i.e., equal to or higher than the desired desorption temperature through the bed, and cooling the bed to the adsorption temperature by passing a purge gas therethrough. Such process steps are disclosed, for example, in above-cited U.S. Pat. No. 4,484,933 hereby incorporated by reference.

It is to be understood that the adsorption zone of the present invention contains an adsorption bed containing adsorbent suitable for adsorbing the particular components to be adsorbed therein. It is to be also understood that the term "countercurrent" denotes that the direction of gas flow through the adsorption bed, is countercurrent with respect to the direction of feed stream flow. Similarly, the term "cocurrent" denotes flow in the same direction as the feed stream flow. The term "enriched" is intended to be with reference to the feed stream composition unless otherwise noted.

It will also be understood that the invention can be carried out using a suitable adsorbent material in the adsorption bed having a selectivity for various components of a feed stream over other such components, thereby providing a less-readily adsorbable component and a more readily adsorbable component. In the present invention, the more readily adsorbable components are heavy hydrocarbons such as $C_6^+$ hydrocarbons and water and the less-readily adsorbable components are $C_1$–$C_6$ hydrocarbons. Suitable adsorbents known in the art and commercially available include crystalline molecular sieves, activated carbons, activated clays, silica gels, activated aluminas and mixtures thereof. The crystalline molecular sieves include zeolitic molecular sieves.

Zeolitic molecular sieves in the calcined form may be represented by the general formula;

$$Me_{2/n}O: Al_2O_3: xSiO_2$$

where Me is a cation, x has a value from about 2 to infinity, and n is the cation valence. Typical well-known zeolites which may be used include: chabazite—also referred to as zeolite D, clinoptilolite, EMC-2, zeolite L, ZSM-5, ZSM-11, ZSM-18, ZSM-57, EU-1, offretite, faujasite, ferrierite, mordenite, zeolite A, ZK-5, zeolite rho, zeolite Beta, boggsite, and silicalite. The adsorbent of the present invention will be selected from these zeolite adsorbents and mixtures thereof. Detailed descriptions of some of the above identified zeolites may be found in D. W. Breck, *ZEOLITE MOLECULAR SIEVES*, John Wiley and Sons, New York, 1974, hereby incorporated by reference.

It is often desirable when using crystalline molecular sieves that the molecular sieve be agglomerated with a binder in order to ensure that the adsorbent will have suitable particle size. Although there are a variety of synthetic and naturally occurring binder materials available such as metal oxides, days, silicas, aluminas, silica-aluminas, silica-zirconias, silica-thorias, silica-berylias, silica-titanias, silica-alumina-thorias, silica-alumina-zirconias, mixtures of these and the like, silica binders are preferred. Silica is preferred because it may be employed to agglomerate the molecular sieve without substantially altering the adsorptive properties of the zeolite. The choice of a suitable binder and methods employed to agglomerate the molecular sieves are generally known to those skilled in the art and need not be further described herein.

The adsorption process operates most efficiently when the adsorption temperature, the temperature at which the adsorption step takes place, is preferably in the range of about 5° C. to about 80° C. The desorption temperature, the temperature at which the desorption effluent is recovered, is preferably in the range of about 120° C. to about 315° C.

Experimental results presented hereinbelow show that when a membrane separation unit processing a gas mixture containing a condensible component experiences a sudden loss of feed flow and during the loss of feed flow the non-permeate zone of the separation unit is purged with a purge gas which comprises less condensible component than in the non-permeate zone, damage to the membrane may be successfully prevented and possibly even improved. When condensation is followed by or results from depressurization or when condensation occurs by permitting the permeate zone pressure to rise, damage to the membrane results.

The combination of a separate adsorption zone to provide purge gas for the membrane during feedstream outages and the use of the permeate stream during normal membrane operation to regenerate the adsorption zone results in a novel approach to maintaining membrane capacity and preventing damage to membrane systems in large commercial processing plants.

DETAILED DESCRIPTION OF THE DRAWINGS

In the drawing, the process of the present invention is illustrated by means of a simplified flow diagram in which such details as pumps, instrumentation, heat-exchange and heat-recovery circuits, compressors, and similar hardware have been deleted as being non-essential to an understanding of the techniques involved. The use of such miscellaneous equipment is well within the purview of one skilled in the art.

With reference now to FIG. 1, a hydrocarbon gas feed stream 200—at a separation pressure ranging from about 700 kPa (100 psia) to about 10.5 MPa (1500 psia) and a separation temperature ranging from about 25°-60° C.—is intermittently passed to a membrane separation zone 400 via lines 200 and 210. The hydrocarbon gas feed stream comprises $C_1-C_6$ hydrocarbons, carbon dioxide, and heavy hydrocarbons such as $C_6^+$ or $C_{10}^+$ hydrocarbons. The membrane separation zone 400 comprises a non-permeate zone 400a and a permeate zone 400b. A non-permeate stream comprising heavy hydrocarbons and having a reduced amount of carbon dioxide relative to the feed stream is withdrawn from a non-permeate zone 400a at a non-permeate pressure essentially equal to the separation pressure via line 220 and a permeate stream enriched in carbon dioxide is withdrawn from the permeate zone at a permeate pressure ranging from about 100 kPa (15 psia) to about 1050 kPa (150 psia) via line 260 and line 280. The non-permeate stream 220 is passed to a separation zone 465 wherein the hydrocarbons such as $C_6^+$ hydrocarbons are removed to produce a sales gas stream in line 230 which is withdrawn as a sales gas production line 250.

The process is operated in an intermittent manner such that when the feed stream is unavailable, the membrane separation zone 400 is shut-down. By the process of this invention, when the feed stream 200 flow is interrupted, a portion of the feed stream 200 is passed via line 310, valve 450, and lines 320 and 330 to adsorption zone 460. Adsorption zone 460 contains an adsorbent selected from the group consisting of activated carbon, silica gel, alumina, molecular sieves, and combinations thereof to selectively remove at least a portion of the $C_6^+$ hydrocarbon from the gas feed stream and produce a purge gas stream in line 360 that comprises less than the non-permeate stream $C_6^+$ hydrocarbons. When the feed stream is not passed to the membrane separation zone, the purge gas stream is passed to the non-permeate zone via lines 360, 380, valve 430 and line 390 to sweep any residual non-permeate gas comprising condensible $C_6^+$ hydrocarbons remaining in the non-permeate zone 400a prior to reducing the pressure in the non-permeate zone.

The adsorption zone is thus available during intermittent feed stream outages to provide a purge gas stream. Preferably, the purge gas stream comprises a portion of the non-permeate stream depleted in the less-readily permeable, condensible component, and more preferably, the purge gas comprises a portion of the feed gas mixture depleted in the less-readily permeable, condensible component relative to the non-permeate stream. When this purge stream is employed to sweep the residual, non-permeate gas from the non-permeate zone, the condensation of heavy hydrocarbons is prevented and damage to the membrane separation zone is thus prevented. During those periods when the feed stream is passed to the membrane separation zone, the adsorption zone is regenerated by any one of the following operations: A second purge gas stream such as a portion of the sales gas in line 240; a fuel gas stream in line 500; or a portion of the permeate stream in line 270; is passed via lines 240, 290, and 290' to heater 410 which heats the second purge gas stream to a regeneration temperature ranging from about 30° C. to about 300° C. to provide a heated regeneration gas stream which is passed via line 300, valve 420, and line 360 to the adsorption zone 460. Thus the adsorption zone may be regenerated with a second purge gas stream selected from the group consisting of a portion of the sales gas, a fuel gas stream, a portion of the permeate stream, nitrogen, a portion of the non-permeate stream and mixtures thereof. It is preferred that the permeate stream be employed as the regenerant during the normal operation of the membrane unit. The permeate stream is essentially free of heavy hydrocarbons and always available for this regeneration without requiring special storage. A spent regeneration gas is recovered from the adsorption zone and passed via line 330, line 340, valve 440, and line 350 where it is withdrawn from the system. The spent regeneration gas 350 may be used to provide fuel gas within the separation zone 465.

The following examples are provided to illustrate the present invention and are not intended to limit the scope of the claims that follows.

EXAMPLES

The following examples of membranes operating in a potentially condensing environment were based on the performance of membrane micromodules, each containing about 2800 mm² composite membrane surface having a separation layer comprised of at least one poly (tetramethyl) bisphenol A phthalate as disclosed in U.S. Pat. No. 4,822,382. The micromodules were pressurized to a separation pressure of about 3.6 MPa (515 psia) with a prepared feed stream without the withdrawal of a non-permeate stream. The condensible-loaded gas feed stream was prepared by sparging a hydrogen gas stream of about 99.9% purity through a liquid hydrocarbon mixture of 10 vol-% benzene and 90 vol-% hexane to saturate the hydrogen gas stream with the hydrocarbon mixture at a temperature of about 24° C. (75° F.). As part of each test, the selectivity of the membrane was measured before and after the exposure to the saturated hydrogen gas stream by pressurizing the membrane micromodule with a gas mixture of 10 vol-% carbon dioxide and 90 vol-% methane. For these examples, the molar ratio of the permeate flow to the feed flow was less than 3%.

EXAMPLE I

CONDENSATION FOLLOWED BY DEPRESSURIZATION

In Example I, a hydrogen gas stream was sparged as described herein above and passed to a membrane micromodule for about 6 hours at a pressure of about 3.6 MPa and a temperature of about 24° C. measured at the sparger while the temperature of the micromodule was maintained at about 37° C. (100° F.) without a non-permeate flow from the membrane module. The micromodule was then depressurized to atmospheric pressure. Following depressurization, a gas mixture containing 10 vol-% carbon dioxide and 90 vol-% methane was passed to the membrane micromodule to repressurize the micromodule to about 3.6 MPa (515 psia) at a temperature of about 49° C. (120° F.) and the selectivity of the membrane was determined. The results are shown in Table 1. Prior to the test, the four samples tested had selectivities of about 6 and permeabilities of about 4. As shown in column O, immediately following condensation and depressurization, the average permeability reached a value of about 46 and the selectivity was reduced to 1. Clearly, the effect of depressurization following condensation produced severe damage to the membrane. Furthermore, even after the micromembrane samples were dried with the $CO_2/CH_4$ gas mixture for several days and at a temperature of about 37° C. (100° F.) and a pressure of 3.6 MPa (515 psia) the $CO_2/CH_4$ selectivity and $CO_2$ permeability did not return to original levels as shown at 4, 11, and 18 days from the point of condensation and depressurization. Thus, depressurization after condensation appeared to catastrophically damage the membrane in a manner which could not be recovered even by drying the membrane module.

TABLE 1

CONDENSATION FOLLOWED BY DEPRESSURIZAITON

| | BEFORE CONDENSATION | DAYS AFTER CONDENSATION | | |
|---|---|---|---|---|
| | | 0 | 4 | 11 | 18 |
| $CO_2$ PERMEABILITY | 4 | 46 | 6 | 5 | 5 |
| $CO_2/CH_4$ SELECTIVITY | 6 | 1 | 2 | 2 | 2 |

EXAMPLE II

NO DEPRESSURIZATION FOLLOWING CONDENSATION

In Example II, the membrane micromodule was supplied with the sparged hydrogen gas of Example I at 3.6 MPa and 37° C. for about 6 hours without withdrawing a non-permeate stream. At the conclusion of the 6 hour period, a non-permeate stream was withdrawn at a rate equal to the feed rate for a period of about 30 minutes while still introducing the sparged hydrogen gas. At the end of the 30 minute period and without depressurizing, the $CO_2/CH_4$ feed was re-introduced and the permeability and selectivity measured. The results are shown in Table 2 at time periods before and at 3 and 4 days following condensation. The results show that the membrane properties were maintained and surprisingly were even slightly improved when, following exposure to a condensing hydrocarbon, the membrane was dried with a purge gas essentially free of condensible components while maintaining the differential pressure between the non-permeate and permeate sides of the membrane.

TABLE 2

NO DEPRESSURIZATION FOLLOWING CONDENSATION

| | BEFORE | DAY 3 | DAY 4 |
|---|---|---|---|
| $CO_2$ PERMEABILITY | 4 | 6 | 3.5 |
| $CO_2/CH_4$ SELECTIVITY | 6 | 7.5 | 9 |

EXAMPLE III

CONDENSATION FOLLOWED BY RAISING PERMEATE PRESSURE

In Example III, the membrane micromodule was sparged with the hydrocarbon saturated hydrogen gas of Example I for about 6 hours at the conditions of Example II. The permeate flow from the membrane module was blocked and the permeate side of the membrane was raised to the feed pressure for a period of about 10 minutes. The introduction of the sparged hydrogen gas was replaced by the $CO_2/CH_4$ feed gas flow of Example I and the permeate and non-permeate flows were established at an operating pressure of about 3.6 MPa and a temperature of about (49° C.) 120° F. The measured permeability and selectivity are shown in Table 3 at 1 day following condensation. Following condensation and allowing the permeate pressure to rise to the feed pressure resulted in the loss of membrane selectivity.

TABLE 3

PERMEATE BLOCKED WITH NO DEPRESSURIZATION

| | BEFORE | AFTER 1 DAY |
|---|---|---|
| $CO_2$ PERMEABILITY | 5 | 13 |
| $CO_2/CH_4$ SELECTIVITY | 7 | 1.5 |

We claim:

1. A process for the shut-down of a membrane separation zone for the removal of a readily permeable component from a feed gas mixture comprising said readily permeable component, a non-permeable component, and a less-readily permeable, condensible component, said process comprising:

a) passing said feed gas mixture at separation conditions to said membrane zone having a non-permeate side and a permeate side to provide a non-permeate stream withdrawn from the non-permeate side and a permeate stream withdrawn from the permeate side at a permeate pressure;

b) intermittently passing a purge stream at a pressure greater than the permeate pressure reduced in said less-readily permeable, condensible component relative to said non-permeate side of said membrane separation zone when said feed gas mixture is not passed to the membrane separation zone to remove at least a portion of a residual gas remaining in the non-permeate side before said residual gas condenses in said membrane separation zone.

2. The process of claim 1 further comprising depressurizing said membrane separation zone simultaneously with step (b).

3. The process of claim 2 wherein said less-readily permeable, condensible component comprises $C_6^+$ hydrocarbons and said readily permeable component comprises carbon dioxide.

4. The process of claim 2 wherein said readily permeable component comprises carbon dioxide.

5. The process of claim 1 wherein said purge stream is selected from the group consisting of nitrogen, methane, ethane, propane, butane, and mixtures thereof.

6. The process of claim 1 wherein said purge stream comprises a portion of said non-permeate stream depleted in said less-readily permeable, condensible component.

7. The process of claim 1 wherein said purge stream comprises said feed gas mixture depleted in said less-readily permeable, condensible component relative to the non-permeate stream.

8. A process for the removal of carbon dioxide from a hydrocarbon feed gas mixture comprising $C_1$ to $C_6$ hydrocarbons, $C_6^+$ hydrocarbons, and carbon dioxide to produce a sales gas stream, said process comprising:

a) intermittently passing said feed gas mixture at separation conditions to a membrane separation zone having a non-permeate zone and a permeate zone to provide a non-permeate stream withdrawn from the non-permeate zone, said non-permeate stream comprising $C_6^+$ hydrocarbons and having a reduced amount of carbon dioxide relative to said feed gas mixture, and a permeate stream withdrawn from the permeate zone at a permeate pressure, said permeate stream enriched in carbon dioxide relative to said feed gas mixture; and b) passing a purge stream reduced in $C_6^+$ hydrocarbons to the non-permeate zone when said feed gas mixture is not passed to said membrane separation zone to prevent condensation of $C_6^+$ hydrocarbons.

9. The process of claim 8 wherein the purge stream reduced in $C_6^+$ hydrocarbons comprises less than about 90 mol-% of the $C_6^+$ hydrocarbons in the non-permeate stream.

10. The process of claim 8 wherein the separation conditions include a separation pressure ranging from about 700 kPa (100 psia) to about 7.5 MPa (1500 psia) and a separation temperature ranging from about 25° C. to about 60° C.

11. The process of claim 8 wherein said purge stream is selected from the group consisting of nitrogen, methane, ethane, butane, propane, butanes, and mixtures thereof.

12. The process of claim 8 wherein said purge stream comprises less than 90% of the $C_6^+$ hydrocarbons in the non-permeate stream.

13. The process of claim 8 further comprising passing at least a portion of said feed gas mixture to an adsorption zone containing an adsorbent selective for the adsorption of $C_6^+$ hydrocarbons when said feed gas mixture is not passed to said membrane separation zone to provide said purge stream.

14. The process of claim 13 wherein said adsorbent comprises silica gel.

15. The process of claim 13 wherein said adsorbent is selected from the group consisting of molecular sieve zeolites, activated carbon, alumina, silica gel and mixtures thereof.

16. The process of claim 13 further comprising passing a second purge gas stream to said adsorption zone to regenerate said adsorption zone when said feed gas mixture is passed to said membrane separation zone.

17. The process of claim 16 further comprising heating said second purge gas stream prior to passing said second purge gas stream to said adsorption zone.

18. The process of claim 17 wherein said second purge gas stream is heated to a temperature ranging from about 30° C. to about 300° C.

19. The process of claim 16 wherein said second purge gas stream comprises a portion of said permeate stream.

20. The process of claim 16 wherein said second purge gas stream is selected from the group consisting of a portion of the sales gas stream, a portion of the permeate stream, a portion of the non-permeate stream, a fuel gas stream, nitrogen, and mixtures thereof.

21. A shut-down process for a membrane separation zone comprising at least one membrane separation module having a non-permeate side at a separation pressure and a permeate side at a permeate pressure for the removal of carbon dioxide from a hydrocarbon gas feed stream comprising light hydrocarbons including $C_1$ to $C_4$ hydrocarbons, $C_6^+$ hydrocarbons, a portion of said $C_6^+$ hydrocarbons being condensable at a saturation pressure, and carbon dioxide, said shut-down process comprising:

a) terminating the flow of a pressurized hydrocarbon feed stream at a feed pressure to said membrane separation module to provide a first residual gas stream in said non-permeate side, said first residual gas stream comprising $C_6^+$ hydrocarbons and having a reduced amount of carbon dioxide relative to said feed gas stream, and a second residual gas stream in said permeate side enriched in carbon dioxide relative to said feed stream; and b) purging said membrane separation module by passing a purge stream essentially free of $C_6^+$ hydrocarbons to the non-permeate side at a pressure greater than said permeate pressure and recovering at least a portion of the first residual gas stream and withdrawing said second residual gas stream from said permeate side.

22. The process of claim 21 further comprising depressurizing the membrane separation module to an intermediate pressure prior to purging said membrane module.

23. The process of claim 22 wherein the intermediate pressure comprises a pressure greater than or equal to about 20 percent of the feed pressure and greater than the permeate pressure.

24. The process of claim 22 further comprising continuing said purging until the $C_6^+$ hydrocarbons have reached a partial pressure comprising less than or equal to about 20 percent of said saturation pressure and further depressurizing the membrane separation module.

25. The process of claim 21 wherein said permeate pressure ranges from about 100 kPa (15 psia) to about 1050 kPa (150 psia).

* * * * *